(12) United States Patent
Ohashi

(10) Patent No.: US 12,142,247 B2
(45) Date of Patent: Nov. 12, 2024

(54) DISPLAY APPARATUS AND IMAGE GENERATION METHOD

(71) Applicant: SONY GROUP CORPORATION, Tokyo (JP)

(72) Inventor: Takeshi Ohashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 79 days.

(21) Appl. No.: 17/758,479

(22) PCT Filed: Jan. 6, 2021

(86) PCT No.: PCT/JP2021/000159
§ 371 (c)(1),
(2) Date: Jul. 7, 2022

(87) PCT Pub. No.: WO2021/145244
PCT Pub. Date: Jul. 22, 2021

(65) Prior Publication Data
US 2023/0028976 A1     Jan. 26, 2023

(30) Foreign Application Priority Data
Jan. 16, 2020   (JP) ................................. 2020-004841

(51) Int. Cl.
*G06F 3/01*      (2006.01)
*G06T 5/50*      (2006.01)
(Continued)

(52) U.S. Cl.
CPC ............. *G09G 5/377* (2013.01); *G06F 3/013* (2013.01); *G06T 5/50* (2013.01); *G06T 5/80* (2024.01);
(Continued)

(58) Field of Classification Search
CPC ........ G06F 3/013; G06F 1/1626; G06F 3/011; G06F 3/04815; G06F 3/0482;
(Continued)

(56) References Cited

U.S. PATENT DOCUMENTS

2016/0059128 A1*   3/2016   Ito .......................... A63F 13/525
                                                                                                                                   463/32
2021/0058604 A1*   2/2021   Nakata ................... H04N 13/25

FOREIGN PATENT DOCUMENTS

JP           2005-121838 A      5/2005
JP           2006-267026 A     10/2006
(Continued)

OTHER PUBLICATIONS

Kasahara, machine translated JP2013-015896. (Year: 2013).*
(Continued)

*Primary Examiner* — Sing-Wai Wu
(74) *Attorney, Agent, or Firm* — CHIP LAW GROUP

(57) ABSTRACT

Provided is a display apparatus that includes a first image sensor, a first distance sensor, a second sensor, a display unit, and an image generation unit. The first image sensor is on a first surface side of an apparatus main body. The first distance sensor is on the first surface side. The second sensor is on a second surface side opposite to the first surface side. The display unit is on the second surface side. The image generation unit generates a display image, using a two-dimensional image of a subject and a distance image of the subject, the two-dimensional image being acquired by the first image sensor, the distance image being acquired by the first distance sensor, on the basis of three-dimensional position information of a viewpoint of a photographer, the three-dimensional position information being calculated on the basis of a sensing result acquired by the second sensor.

13 Claims, 13 Drawing Sheets

(51) Int. Cl.
  *G06T 5/80* (2024.01)
  *G06T 7/70* (2017.01)
  *G06V 10/26* (2022.01)
  *G06V 10/74* (2022.01)
  *G09G 5/377* (2006.01)

(52) U.S. Cl.
  CPC ............... *G06T 7/70* (2017.01); *G06V 10/26* (2022.01); *G06V 10/761* (2022.01); *G06T 2207/10028* (2013.01); *G06T 2207/20221* (2013.01); *G09G 2340/10* (2013.01); *G09G 2340/12* (2013.01)

(58) Field of Classification Search
  CPC ...... G06F 3/04842; G06F 3/0488; G06F 3/14; G06T 5/50; G06T 7/70; G06T 5/80; G06T 2207/10028; G06T 2207/20221; G06T 19/00; G06V 10/26; G06V 10/761; G06V 20/20; G09G 2340/12; G09G 5/377; G09G 2340/10; H04N 5/66; H04N 13/31; H04N 13/366; G01B 11/00
  See application file for complete search history.

(56) References Cited

FOREIGN PATENT DOCUMENTS

| | | |
|---|---|---|
| JP | 2009271732 A | 11/2009 |
| JP | 2013-015896 A | 1/2013 |
| JP | 2013-258583 A | 12/2013 |
| JP | 2015-531526 A | 11/2015 |
| JP | 2016-051918 A | 4/2016 |
| JP | 2016-201788 A | 12/2016 |
| JP | 2018-022292 A | 2/2018 |
| JP | 2018-025551 A | 2/2018 |
| JP | 2019-125345 A | 7/2019 |
| JP | 2002-300602 A | 10/2022 |

OTHER PUBLICATIONS

Tagaya, machine translated JP2013-258583. (Year: 2013).*
Sawaguchi, machine translated JP20180925551. (Year: 2018).*
International Search Report and Written Opinion of PCT Application No. PCT/JP2021/000159, issued on Mar. 2, 2021, 12 pages of ISRWO.

* cited by examiner

DISPLAY APPARATUS AND IMAGE GENERATION METHOD

CROSS REFERENCE TO RELATED APPLICATIONS

This application is a U.S. National Phase of International Patent Application No. PCT/JP2021/000159 filed on Jan. 6, 2021, which claims priority benefit of Japanese Patent Application No. JP 2020-004841 filed in the Japan Patent Office on Jan. 16, 2020. Each of the above-referenced applications is hereby incorporated herein by reference in its entirety.

TECHNICAL FIELD

The present technology relates to a display apparatus, an image generation method, and a program.

BACKGROUND ART

Mobile devices equipped with display units, including mobile phones such as smartphones and tablet terminals, are widely spreading. Mobile devices equipped with cameras can display images captured by the cameras on their display units or can present augmented reality (AR) information superimposed on the images. For example, a scene on the far side of a mobile device, which is captured by the camera mounted on the mobile device, is displayed on the display unit, so that the photographer is provided with an AR experience having a high sense of immersion and sense of realism.

Patent Literature 1 discloses a technique in which a scene on the far side of a device changes in accordance with a viewpoint position of a user to be displayed. Patent Literature 1 describes a technique for improving the sense of realism of remote communication, and describes that use of a special display panel including a display element and an imaging element embedded therein makes it possible to display different videos in various directions and to simultaneously image an object from various directions.

CITATION LIST

Patent Literature

Patent Literature 1: Japanese Patent Application Laid-open No. 2002-300602

DISCLOSURE OF INVENTION

Technical Problem

When an image on the far side of a display apparatus, which is captured by a camera mounted on the display apparatus, is displayed on the display unit, the image being displayed is visually recognized as a miniature garden in the display apparatus.

In view of the above circumstances, it is an object of the present technology to provide a display apparatus, an image generation method, and a program that are capable of displaying an image such that an image displayed on a display unit and a scene outside a display apparatus appear to be continuous.

Solution to Problem

To achieve the above object, a display apparatus according to the present technology includes a first image sensor, a first distance sensor, a second sensor, a display unit, and an image generation unit.

The first image sensor is disposed on a first surface side of an apparatus main body.

The first distance sensor is disposed on the first surface side.

The second sensor is disposed on a second surface side opposite to the first surface side.

The display unit is disposed on the second surface side.

The image generation unit generates a display image to be displayed on the display unit, using a two-dimensional image of a subject and a distance image of the subject, the two-dimensional image being acquired by the first image sensor, the distance image being acquired by the first distance sensor, on the basis of three-dimensional position information of a viewpoint of a photographer, the three-dimensional position information being calculated on the basis of a sensing result acquired by the second sensor.

According to such a configuration of the present invention, it is possible to generate a display image viewed from the viewpoint of the photographer, and the photographer visually recognizes that the scene of the image displayed on the display unit and the scene outside the display apparatus are continuous.

In order to achieve the above object, an image generation method according to the present technology is an image generation method for a display apparatus including a first image sensor disposed on a first surface side of an apparatus main body, a first distance sensor disposed on the first surface side, a second sensor disposed on a second surface side opposite to the first surface side, and a display unit disposed on the second surface side, the method including: acquiring a two-dimensional image of a subject from the first image sensor; acquiring a distance image of the subject from the first distance sensor; acquiring a sensing result from the second sensor; calculating three-dimensional position information of a viewpoint of a photographer on the basis of the sensing result; and generating a display image to be displayed on the display unit, using the two-dimensional image and the distance image, on the basis of the three-dimensional position information.

In order to achieve the above object, a program according to the present technology causes a display apparatus including a first image sensor disposed on a first surface side of an apparatus main body, a first distance sensor disposed on the first surface side, a second sensor disposed on a second surface side opposite to the first surface side, and a display unit disposed on the second surface side to execute the steps of: acquiring a two-dimensional image of a subject from the first image sensor; acquiring a distance image of the subject from the first distance sensor; acquiring a sensing result from the second sensor; calculating three-dimensional position information of a viewpoint of a photographer on the basis of the sensing result; and generating a display image to be displayed on the display unit, using the two-dimensional image and the distance image, on the basis of the three-dimensional position information.

MODE(S) FOR CARRYING OUT THE INVENTION

Hereinafter, a display apparatus according to the present technology will be described with reference to the drawings.

First Embodiment

[Configuration of Display Apparatus]

The present technology can be suitably used for mobile phones such as smartphones and mobile devices such as tablets that serve as display apparatuses with display units. In the following embodiments, a display apparatus in the form of a smartphone will be described as an example.

Figure 1A:
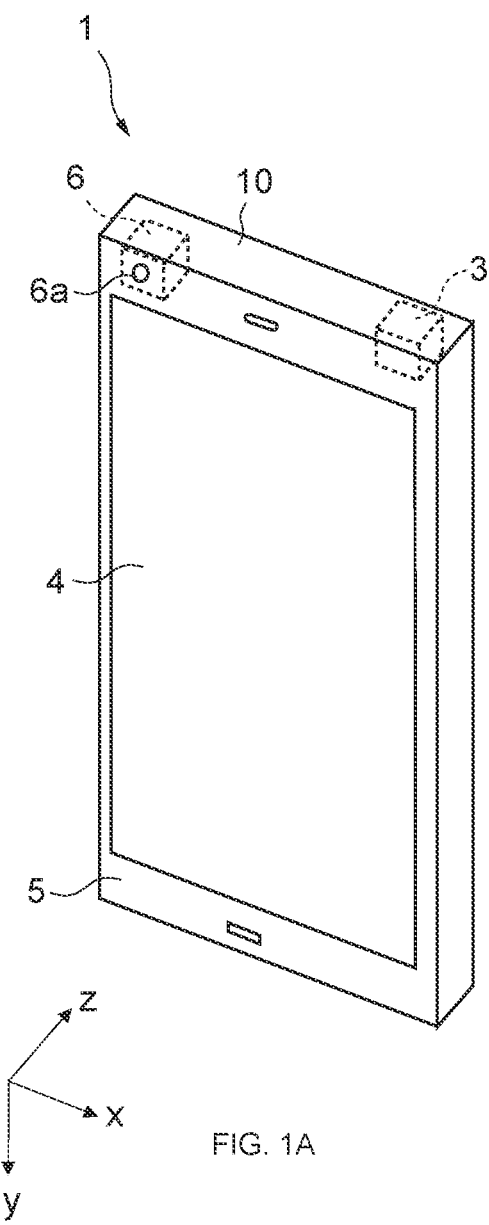
FIGS. 1A and 1B are perspective view of a display apparatus according to an embodiment of the present technology as viewed from the front side and the rear side.
Figure 1B:
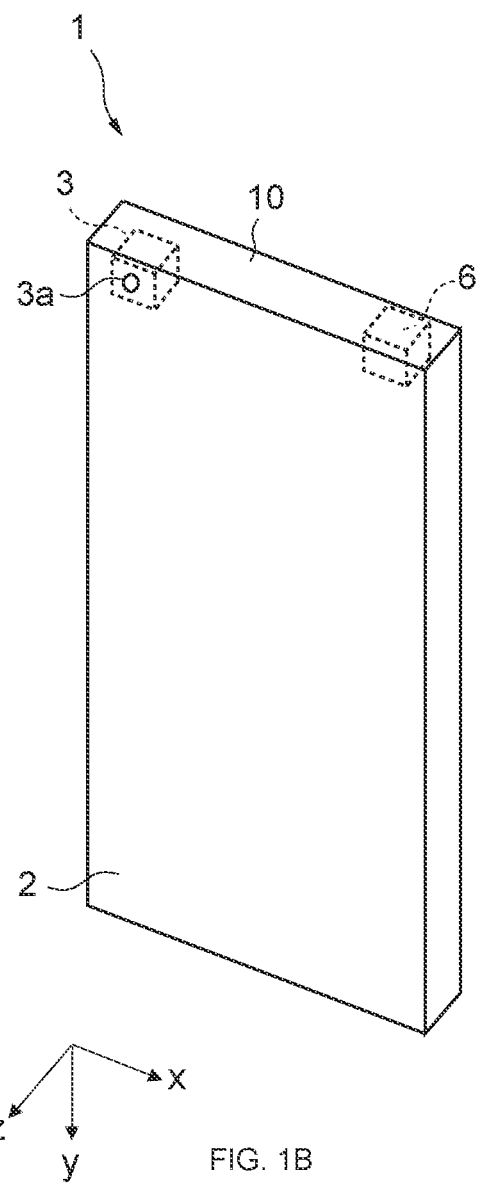

FIGS. 1A and 1B are perspective view for describing the outer shape of a display apparatus according to a first embodiment of the present technology. FIG. 1A is a perspective view of the display apparatus as viewed from the front side on which a display unit is located, and FIG. 1B is a perspective view thereof as viewed from the rear side.

As shown in FIGS. 1A and 1B, the display apparatus 1 includes a housing 10, a rear camera 3, a front camera 6 as a second sensor, and a display unit 4. The display apparatus 1 is configured by holding the rear camera 3, the front camera 6, a display panel constituting the display unit 4, a drive circuit, various sensors, and the like in the housing 10.

The main body of the display apparatus 1 has a first surface 2 on the rear side, and a second surface 5 on the front side located on the opposite side of the first surface 2. The first surface 2 and the second surface 5 have a parallel positional relationship. The xyz coordinate directions perpendicular to each other in the figure correspond to the width, length, and height of the display apparatus 1 of a substantially rectangular parallelopiped shape. The plane parallel to the first surface 2 is assumed as the xy plane, and the thickness direction of the display apparatus 1 corresponding to the height direction is assumed as the z-axis.

An imaging lens 3a of the rear camera 3 is disposed on the first surface 2 side, and the rear camera 3 images a subject facing the first surface 2.

An imaging lens 6a of the front camera 6 is disposed on the second surface 5 side, and the front camera 6 images a subject facing the second surface 5. The subject is usually a photographer.

The second surface 5 is provided with a display panel constituting the display unit 4. The display unit 4 is constituted by image display means such as a liquid crystal display or an organic electro-luminescence display (organic EL display). The display unit 4 is configured to be capable of displaying images transmitted and received from an external device through a communication unit (not shown), a button for input operation, images captured by the front camera 6 and the rear camera 3, and the like. The images include still images and moving images.

In general, a photographer or a user who performs imaging using the display apparatus 1 views an image displayed on the display unit 4, and performs an input operation or the like from an operation screen displayed on the display unit 4. Therefore, the photographer is located on the second surface 5 side of the display apparatus 1 in order to visually recognize the display unit 4. In the specification, the expression of the "far side of the display apparatus 1" is used sometimes, which indicates the direction viewed from the photographer and corresponds to the first surface 2 side of the display apparatus 1. On the far side of the display apparatus 1, the subject to be imaged by the rear camera 3 is located.

Figure 2:
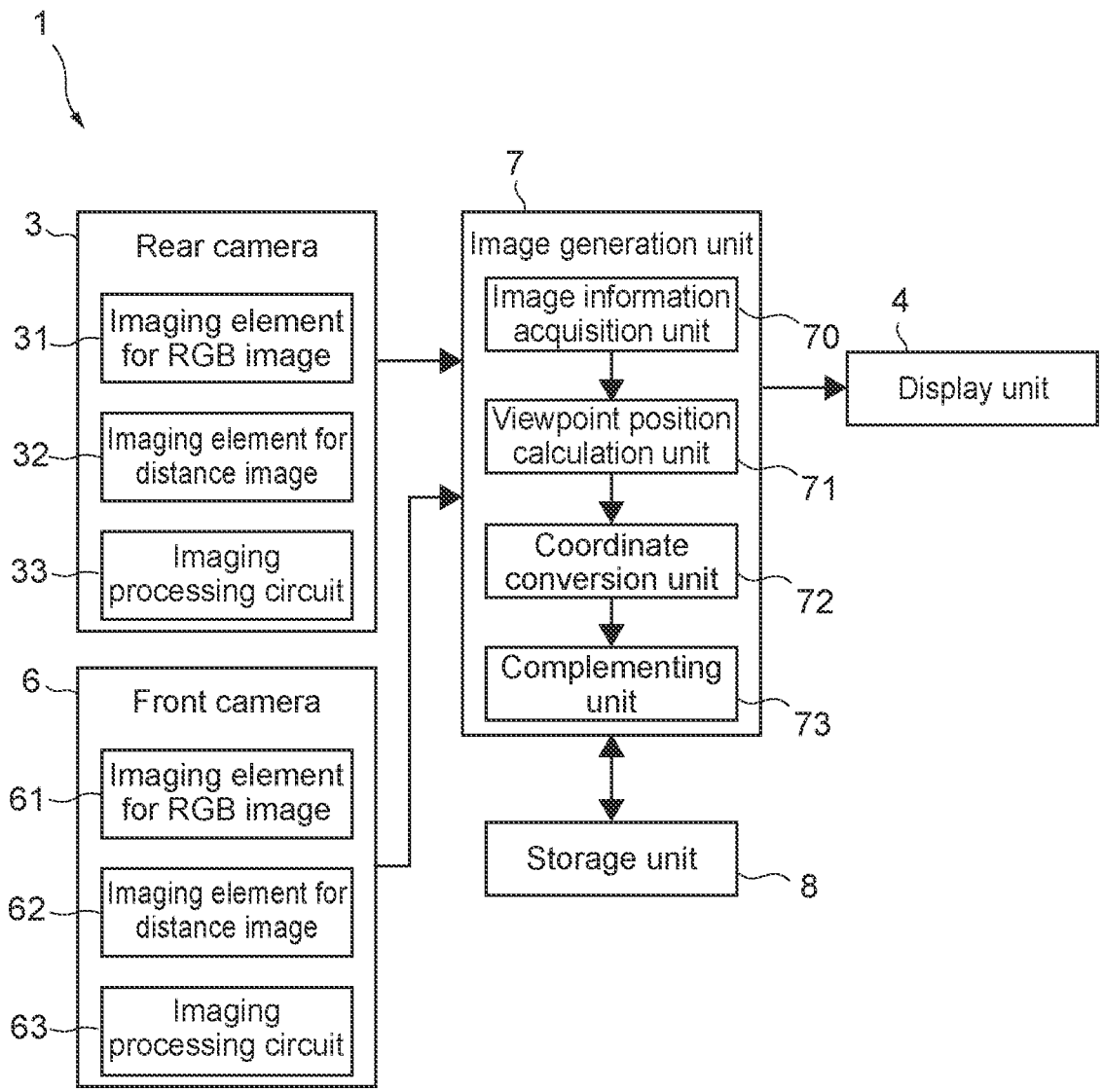
FIG. 2 is a block diagram of a configuration of the display apparatus.

FIG. 2 is a block diagram showing a functional configuration of the display apparatus 1.

As shown in FIG. 2, the display apparatus 1 includes the rear camera 3, the front camera 6, an image generation unit 7, a storage unit 8, and the display unit 4.

In this embodiment, both the rear camera 3 and the front camera 6 have a function of an image sensor and a function of a distance sensor.

The image sensor captures a two-dimensional color image (hereinafter, referred to as a two-dimensional RGB image or an RGB image) of a subject.

The distance sensor captures a distance image of the subject. A time-of-flight (ToF) method can be suitably used for the distance sensor, and in this embodiment, an example in which a distance sensor of the ToF method is used will be described. In the distance sensor of the ToF method, a distance image having information of the distance between the distance sensor and the subject is acquired using near-infrared light (NIR light). The distance image, which is a sensing result acquired by the ToF-method distance sensor of the front camera 6 as a second sensor, also includes the two-dimensional position information of the eye of the photographer in addition to the distance information.

In this embodiment, an example will be given in which the rear camera 3 and the front camera 6 are each a single imaging device and can acquire both an RGB image and a distance image. Hereinafter, the RGB image and the distance image may be collectively simply referred to as images.

As shown in FIG. 2, the rear camera 3 includes an imaging element for RGB image 31 that constitutes a part of the image sensor, an imaging element for distance image 32 that constitutes a part of the distance sensor, an imaging processing circuit 33, an on-chip lens (not shown), a color filter (not shown), and a light emitting unit (not shown).

Similarly, the front camera 6 includes an imaging element for RGB image 61 that constitutes a part of the image sensor, an imaging element for distance image 62 that constitutes a part of the distance sensor, an imaging processing circuit 63, an on-chip lens (not shown), and a color filter (not shown).

In the rear camera 3 (front camera 6), color filters are provided between the on-chip lens, and the imaging element for RGB image 31 (61) and the imaging element for distance image 32 (62), so that R pixels, G pixels, B pixels, and NIR pixels can be disposed.

Here, the R pixel is a pixel for obtaining charges corresponding to the light of a red component from the light transmitted through the color filter that transmits the wavelength component of red (R). The G pixel is a pixel for obtaining charges corresponding to the light of a green (G) component from the light transmitted through the color filter that transmits the wavelength component of green (G). The B pixel is a pixel for obtaining charges corresponding to the light of a blue (B) component from the light transmitted through the color filter that transmits the wavelength component of blue (B). The NIR pixel is a pixel for obtaining charges corresponding to the wavelength band of the NIR light from the light transmitted through the filter that transmits the wavelength component of the near-infrared light (NIR light).

The imaging processing circuit 33 (63) processes the imaging signals obtained by the imaging element for RGB image 31 (61) and the imaging element for distance image 32 (62), and generates an RGB image and a distance image corresponding to the subject.

The on-chip lens is provided for each pixel and condenses light from the outside to be incident on the color filter of each pixel.

The light emitting unit constituting a part of the distance sensor is used to measure the distance between the camera and the subject. The light emitting unit emits NIR light. The imaging element for distance image 32 (62) receives the return light when the NIR light emitted from the light emitting unit is reflected by the subject. The light emitting unit is configured to include a light emitting member such as a light emitting diode (LED) and a driver circuit for causing the light emitting member to emit light.

The display unit 4 displays the display image generated by the image generation unit 7. The display unit 4 is configured to be capable of displaying images respectively captured by the rear camera 3 and the front camera 6. In the following description, an example in which an image captured by the rear camera 3 is displayed on the display unit 4 will be described.

The image generation unit 7 includes an image information acquisition unit 70, a viewpoint position calculation unit 71, a coordinate conversion unit 72, and a complementing unit 73.

The image information acquisition unit 70 acquires the RGB image and the distance image of the subject from the rear camera 3, and acquires the RGB image and the distance image of the photographer from the front camera 6. Note that, as will be described later, if a display image is generated in which the scene of the image displayed on the display unit 4 and the scene outside the display apparatus 1 appear to be continuous as if the far side of the display apparatus 1 is seen through, at least the distance image only needs to be acquired from the front camera 6.

The viewpoint position calculation unit 71 calculates the three-dimensional position of the viewpoint of the photographer on the basis of the distance image captured by the front camera 6.

The coordinate conversion unit 72 performs coordinate conversion on the image acquired by the rear camera 3 on the basis of the three-dimensional position information of the viewpoint of the photographer, and generates a display image as an RGB image viewed from the viewpoint of the photographer.

If there is an occlusion region in the display image generated by the coordinate conversion unit 72, the complementing unit 73 complements the occlusion region to generate a display image to be displayed on the display unit 4.

The display image generation method in the image generation unit 7 will be described later.

Figure 3:
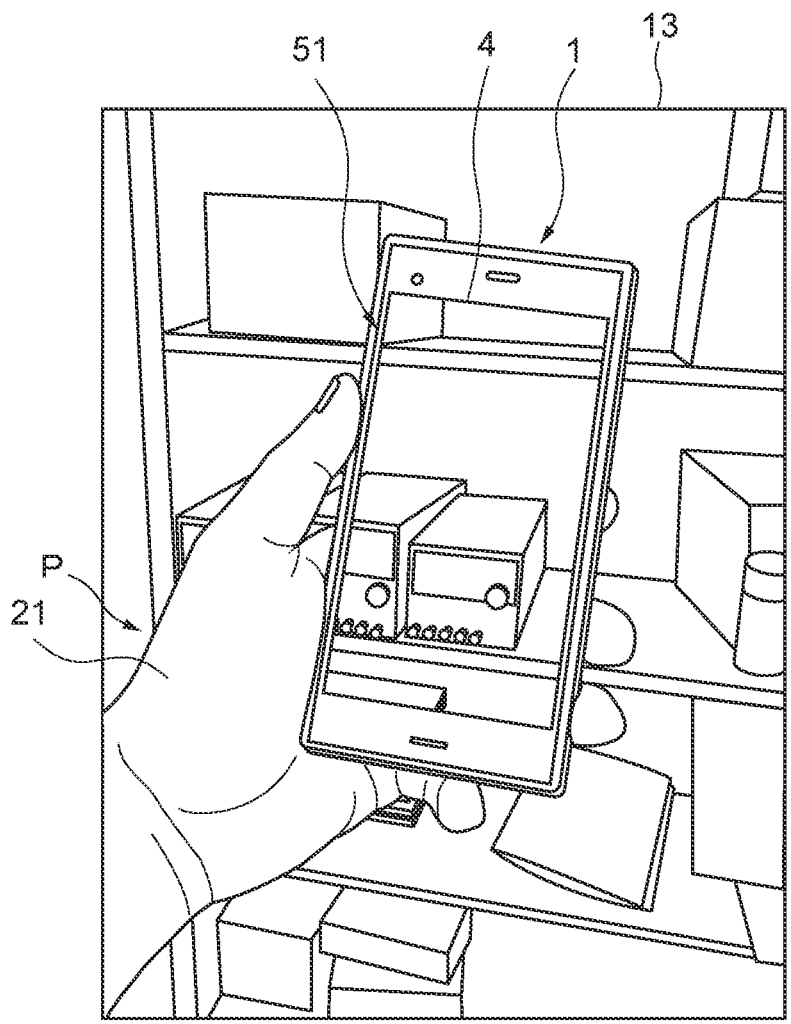
FIG. 3 is a diagram showing a state in which a photographer holds in the hand the display apparatus according to the first embodiment.

FIG. 3 is a diagram showing a state in which a photographer P grips the display apparatus 1 according to this embodiment with a left hand 21. In FIG. 3, an image obtained by imaging the far side of the display apparatus 1 is displayed on the display unit 4 of the display apparatus 1.

In this embodiment, the image acquired with reference to the rear camera 3 is converted into an image viewed from the viewpoint of the photographer P to generate a display image 51. As a result, as shown in FIG. 3, a scene 13 outside the display apparatus 1 and the scene of a display image 53 displayed on the display unit 4 of the display apparatus 1 appear to be continuous. Thus, the region blocked by the presence of the display apparatus 1 for the photographer is recognized by the photographer P as if the landscape on the far side is seen through the display apparatus 1, and the scene displayed on the display unit 4 is not like a miniature garden. Therefore, for example, if a superimposing image of a virtual object or the like, which is augmented reality (AR) information, is superimposed on the image and displayed by AR, the user can experience a high sense of immersion and sense of realism of the AR world. The superimposition of virtual images such as virtual objects and virtual characters will be described later as another embodiment.

The storage unit 8 includes a memory device such as a RAM, and a non-volatile recording medium such as a hard disk drive, and stores programs for causing the display apparatus to execute the processing of generating a display image to be displayed on the display unit 4 of the display apparatus 1.

The programs stored in the recording unit 8 are for causing the display apparatus to execute: the step of acquiring an RGB image that is a two-dimensional image of the subject and a distance image of the subject from the rear camera 3; the step of acquiring a distance image serving as a sensing result of the front camera 6; the step of calculating three-dimensional position information of the viewpoint of the photographer P on the basis of the distance image of the front camera 6; and the step of generating a display image to be displayed on the display unit 4, using the RGB image and the distance image acquired by the rear camera 3, on the basis of the three-dimensional position information.

[Display Image Generation Method]

Figure 4A:
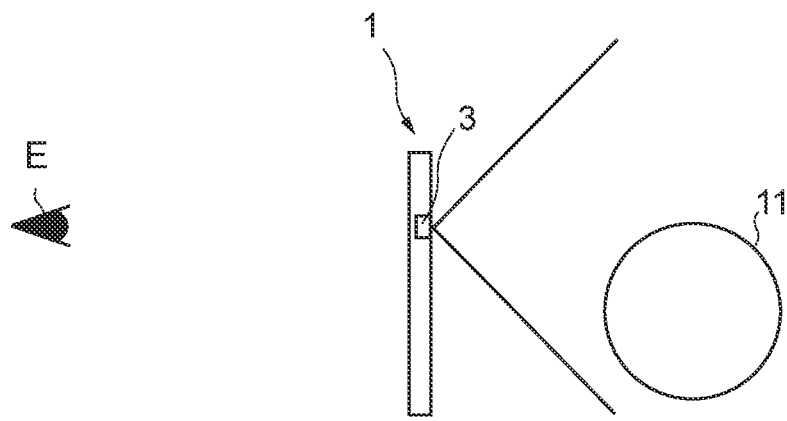
FIGS. 4A and 4B are diagrams showing the outline of a display image generation method in the display apparatus.
Figure 4B:
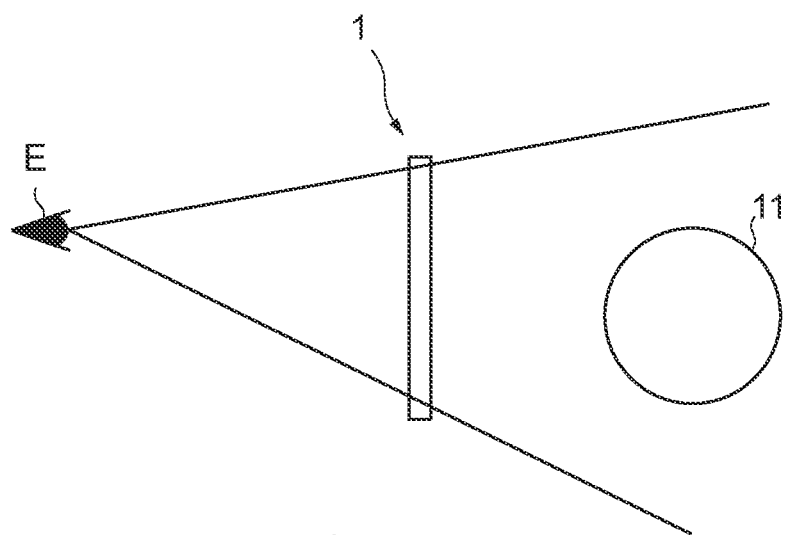

FIGS. 4A and 4B are diagrams for describing the outline of the display image generation method.

As shown in FIG. 4A, the image of an object 11 serving as a subject to be acquired by the rear camera 3 is an image based on the position of the rear camera 3. As shown in FIG. 4A, in the display image generation method of this embodiment, the image of the object 11 acquired by the rear camera 3 is subjected to coordinate conversion so as to be an image viewed from a viewpoint E, thereby generating a display image. Further, if there is an occlusion region in the display image generated by the coordinate conversion, occlusion region complementing processing is performed, and a display image to be displayed on the display unit 4 is generated. It will be described below.

Figure 5:
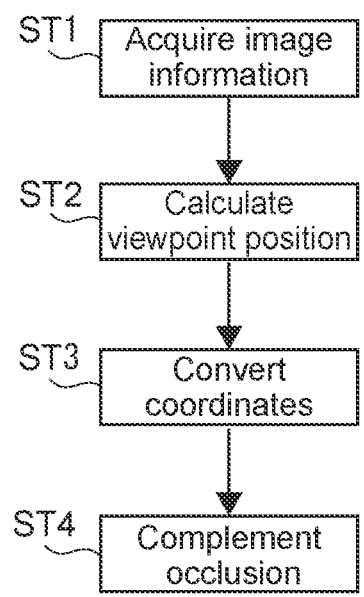
FIG. 5 is a flowchart of the display image generation method in the display apparatus.

FIG. 5 is a flowchart of the display image generation method.

As shown in FIG. 5, the image information acquisition unit 70 acquires the RGB image and the distance image of the subject from the rear camera 3, and the RGB image and the distance image of the photographer from the front camera 6 (ST1). The rear camera 3 is calibrated to the rear side, and the front camera 6 is calibrated to the front side. From the RGB image and the distance image acquired by the rear camera 3, point cloud information from the rear camera 3 to the object 11 serving as a subject can be acquired.

Next, the viewpoint position calculation unit 71 calculates the three-dimensional position of the viewpoint of the photographer on the basis of the distance image captured by the front camera 6 (ST2). The calculation processing will be described below.

Next, the coordinate conversion unit 72 converts coordinates using the three-dimensional position information of the viewpoint of the photographer such that the image acquired by the rear camera 3 becomes an image viewed from the viewpoint of the photographer (ST3). The coordinate conversion processing will be described below.

Next, if there is an occlusion region in the display image coordinate-converted by the coordinate conversion unit 72, the complementing unit 73 complements the occlusion region to generate a display image to be displayed on the display unit 4 (ST4). The occlusion region complementing processing will be described below.

(Calculation Processing for Three-Dimensional Position of Viewpoint)

The viewpoint will be described with reference to FIGS. 6A and 6B.

Figure 6A:
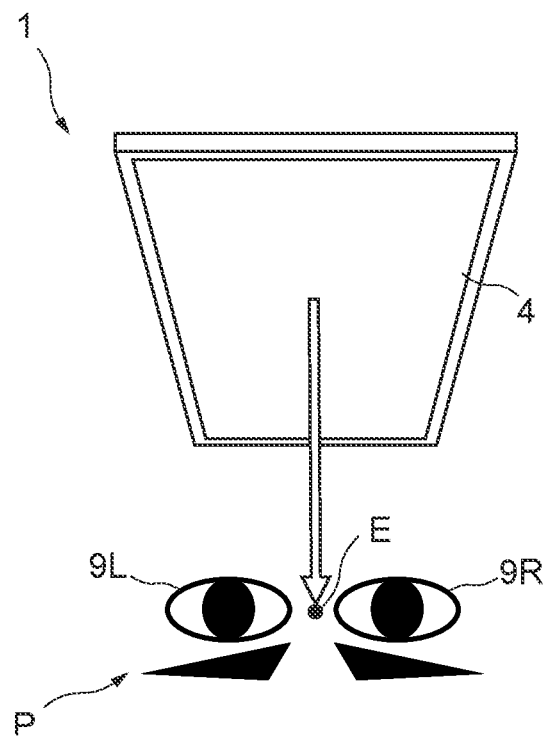
FIGS. 6A and 6B are diagrams for describing calculation processing for a three-dimensional position of a viewpoint in the display image generation method.

As shown in of FIG. 6A, when both eyes of the photographer P are open, the center point, which bisects the line segment formed by connecting the center points of the respective pupils (black eyes) of a right eye 9R and a left eye 9L of the photographer P, is set as the viewpoint E.

Figure 6B:
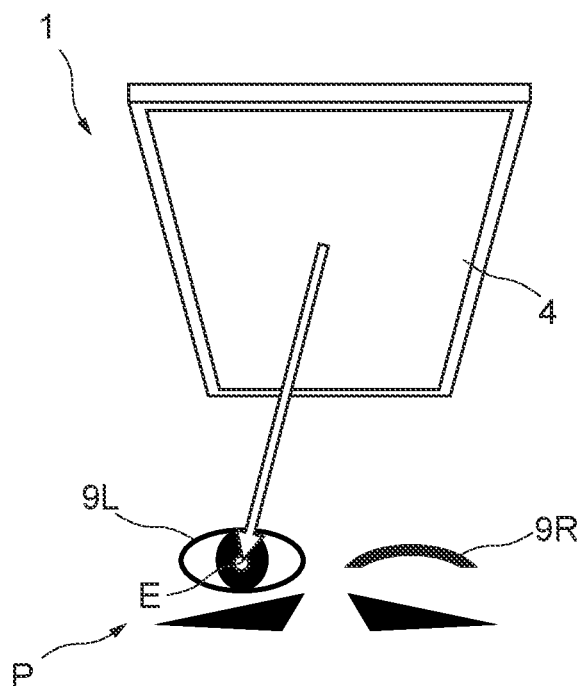

As shown in FIG. 6B, when one eye of the photographer P is closed and the other eye is open, the center point of the pupil of the open eye is set as the viewpoint E. In the example shown in FIG. 6B, the right eye 9R is closed, and the center point of the pupil of the open left eye 9L is the viewpoint E. In FIG. 6B, the viewpoint E is expressed by a white circle. The viewpoint E is used as a reference when a display image viewed from the photographer P is generated using an image acquired by the rear camera 3.

In this embodiment, the front camera 6 includes a ToF sensor that is a distance sensor. The viewpoint position calculation unit 71 performs the face detection and the two-dimensional position detection of the pupils of the right and left eyes by conventional methods on the NIR image that is a distance image acquired by the ToF sensor. The viewpoint position calculation unit 71 then acquires the three-dimensional position information of the center point of each pupil of the right and left eyes from the ToF distance value of the detected pixel.

Furthermore, the viewpoint position calculation unit 71 calculates the three-dimensional position information of the viewpoint E from the acquired three-dimensional position information of the center point of each pupil of the right and left eyes. As described above, when both eyes of the photographer P are open, the center point between the right and left pupils is set as the viewpoint E, and when one eye is open, the center point of the pupil of the open eye is set as the viewpoint E.

In such a manner, in this embodiment, it is possible to generate an optimal display image in accordance with the open/closed state of the eyes.

(Coordinate Conversion Processing)

Figure 7:
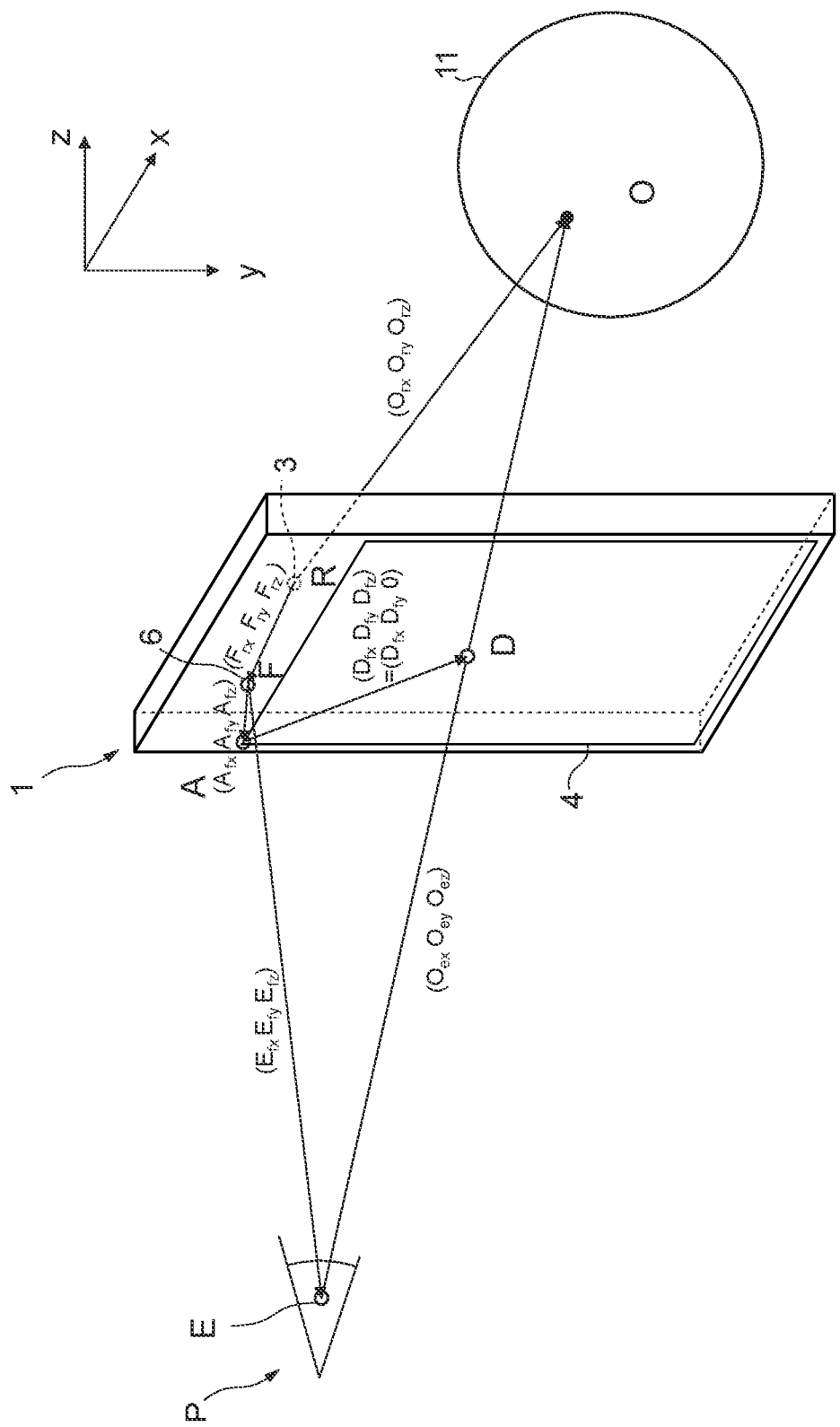
FIG. 7 is a diagram for describing coordinate conversion processing in the display image generation method.

The coordinate conversion processing will be described with reference to FIG. 7.

The coordinate conversion unit 72 calculates coordinate values on the display unit 4 of the display apparatus 1, to which the point cloud of the object 11 serving as the subject acquired by the rear camera 3 is to be mapped.

Hereinafter, the symbols E, D, A, F, R, and O shown in FIG. 7 and the equations to be described later indicate the three-dimensional positions of respective points.

The meaning of each symbol is as follows.
E: Viewpoint
A: Display unit origin on the upper left of the display unit
F: Front camera
R: Rear camera
O: Object The viewpoint E is the position of the viewpoint calculated by the three-dimensional position calculation method for the viewpoint.

The display unit origin A is a point located at the upper left corner of the surface of the rectangular display unit 4 when the photographer P faces the second surface 5 on which the display unit 4 is disposed and grips the display apparatus 1 in the vertical direction such that the rear camera 3 and the front camera 6 are positioned higher than the display unit 4.

The point F of the front camera 6 is the origin of the camera coordinates of the front camera 6.

The point R of the rear camera 3 is the origin of the camera coordinates of the rear camera 3.

The point O of the object 11, which is the subject, is any point on the object 11.

Further, the subscripts of the vectors between the three-dimensional points represent the reference coordinate positions and are represented by lowercase letters corresponding to uppercase letters of the symbols. The xyz represent coordinate axis directions.

The calculation in the coordinate conversion processing is performed in the order of the following 1 and 2 to be described below.

1. In a viewpoint coordinate system e, a straight line from the viewpoint E to any point O of the object 11 and a plane D of the display unit 4 are expressed by mathematical expressions, respectively. The viewpoint coordinate system e is a coordinate system when the viewpoint E is set as the origin. Further, the plane D of the display unit 4 corresponds to the surface of the display unit 4.
2. The coordinates of the intersection point between the straight line and the plane in the above 1 are obtained.

Note that it is assumed that the front camera 6, the rear camera 3, and the display unit 4 are calibrated at their respective positions and can be handled to have a parallel positional relationship.

Further, in the xyz coordinate directions, the z coordinate is assumed to have a negative value in a direction from the second surface 5 toward the first surface 2. For example, the z coordinate of the viewpoint coordinates detected by the front camera 6 always has a negative value. When the photographer P faces the second surface 5 on which the display unit 4 is disposed and grips the display apparatus 1 in the vertical direction such that the rear camera 3 and the front camera 6 are positioned higher than the display unit 4, the y coordinate is assumed to have a positive value in the direction from the top toward the bottom as viewed from the photographer P, and the x coordinate is assumed to have a positive value in the direction from the left to the right as viewed from the photographer P.

In the drawings and the following description, Or represents the xyz coordinate values of the point O of the object 11 when the point R of the rear camera 3 is the origin. Orx, Ory, and Orz represent the x-coordinate value, y-coordinate value, and z-coordinate value of the point O of the object 11, respectively, when the point R of the rear camera 3 is the origin.

Oe represents the xyz coordinate values of the point O of the object 11 when the viewpoint E is the origin. Oex, Oey, and Oez represent the x-coordinate value, y-coordinate value, and z-coordinate value of the point O of the object 11, respectively, when the viewpoint E is the origin.

Df represents the xyz coordinate values of the point on the plane D when the point F of the front camera 6 is the origin. Dfx, Dfy, and Dfz represent the x-coordinate value, y-coordinate value, and z-coordinate value of the point on the plane D, respectively, when the point F is the origin.

Ef represents the xyz coordinate values of the viewpoint E when the point F of the front camera 6 is the origin. Efx, Efy, and Efz represent the x-coordinate value, y-coordinate value, and z-coordinate value of the viewpoint E, respectively, when the point F is the origin.

Af represents the xyz coordinate values of the display unit origin A when the point F of the front camera 6 is the origin. Afx, Afy, and Afz represent the x-coordinate value, y-coordinate value, and z-coordinate value of the display unit origin A, respectively, when the point F is the origin.

Fr represents the xyz coordinate values of the point F of the front camera 6 when the point R of the rear camera 3 is the origin. Frx, Fry, and Frz represent the x-coordinate value, y-coordinate value, and z-coordinate value of the point F of the front camera 6, respectively, when the point R of the rear camera 3 is the origin.

First, the above 1 will be described.

The equation for the coordinates Oe of the object in the viewpoint coordinate system e is as follows.

$$Oe=Or-Fr-Ef$$

The straight line from the point E to the point O in the viewpoint coordinate system e can be expressed by the following three equations. Those three equations are Equations (1).

$$x=a(Orx-Frx-Efx)$$

$$y=a(Ory-Fry-Efy)$$

$$z=a(Orz-Frz-Efz) \quad \text{Equation (1)}$$

where a represents a parameter.

The expression for the plane D in the viewpoint coordinate system e is as follows.

$$De=-Ef+Af+Df$$

This equation can be expressed by the following three equations. Those three equations are Equations (2).

$$x=-Efx+Afx+Dfx$$

$$y=-Efy+Afy+Dfy$$

$$z=-Efz+Afz \quad \text{Equations (2)}$$

Next, the above 2 will be described.

(Dfx, Dfy) indicates coordinates on the display unit 4 (referred to as display unit coordinates). The display unit coordinates, to which an optional point O of the object 11 is to be mapped, are obtained, that is, the coordinates (Dfx, Dfy) are expressed by coordinates with an optional point O of the object 11 as the origin. Thus, the display unit coordinate values of the display unit 4, to which the point cloud of the object 11 obtained by the rear camera 3 is to be mapped, are calculated. A specific calculation method is as follows.

From the Equations (1) and (2) above, the following equations are obtained.

$$a(Orx-Frx-Efx)=-Efx+Afx+Dfx \quad \text{Equation (3)}$$

$$a(Ory-Fry-Efy)=-Efy+Afy+Dfy \quad \text{Equation (4)}$$

$$a(Orz-Frz-Efz)=-Efz+Afz \quad \text{Equation (5)}$$

From the Equation (5) above, the following equation is obtained.

$$a=(-Efz+Afz)/(Orz-Frz-Efz) \quad \text{Equation (6)}$$

From the above Equations (3), (4), and (6), the following equations are obtained.

$$Dfx=(Orx-Frx-Efx)(-Efz+Afz)/(Orz-Frz-Efz)+Efx-Afx$$

$$Dfy=(Ory-Fry-Efy)(-Efz+Afz)/(Orz-Frz-Efz)+Efy-Afy$$

Thus, (Dfx, Dfy) can be represented by the coordinates with the optional point O of the object 11 as the origin. By such coordinate conversion processing, the display unit coordinate values of the display unit 4, to each of which each point of the point cloud of the object 11 obtained by the rear camera 3 is to be mapped, are calculated. This is performed on all points of the point cloud of the object 11, so that it is possible to know where the object 11 should be displayed on the display unit 4. As a result, the image of the scene on the far side of the display apparatus 1 displayed on the display unit 4 is an image viewed from the viewpoint E of the photographer P. Therefore, the photographer P can visually recognize the image as if the scene of the image displayed on the display unit 4 and the scene outside the display apparatus 1 are continuous, and can feel as if the far side of the display apparatus 1 is seen through.

Thus, in the coordinate conversion processing, the display image is generated such that the coordinates of the intersection between the straight line from the viewpoint E of the photographer P to each point of the point cloud of the object (subject) and the plane of the display unit 4 are calculated for each point, and each point of the point cloud of the subject is mapped to the corresponding intersection coordinates.

(Occlusion Complementing Processing)

If the coordinate conversion processing is performed using the point cloud data of the image before the coordinate conversion processing to generate an image of a viewpoint different from the image before the coordinate conversion processing, an occlusion region is generated in the generated image. In the occlusion complementing processing, the processing of complementing the occlusion region is executed, and a display image to be finally displayed on the display unit 4 is generated.

Figure 8:
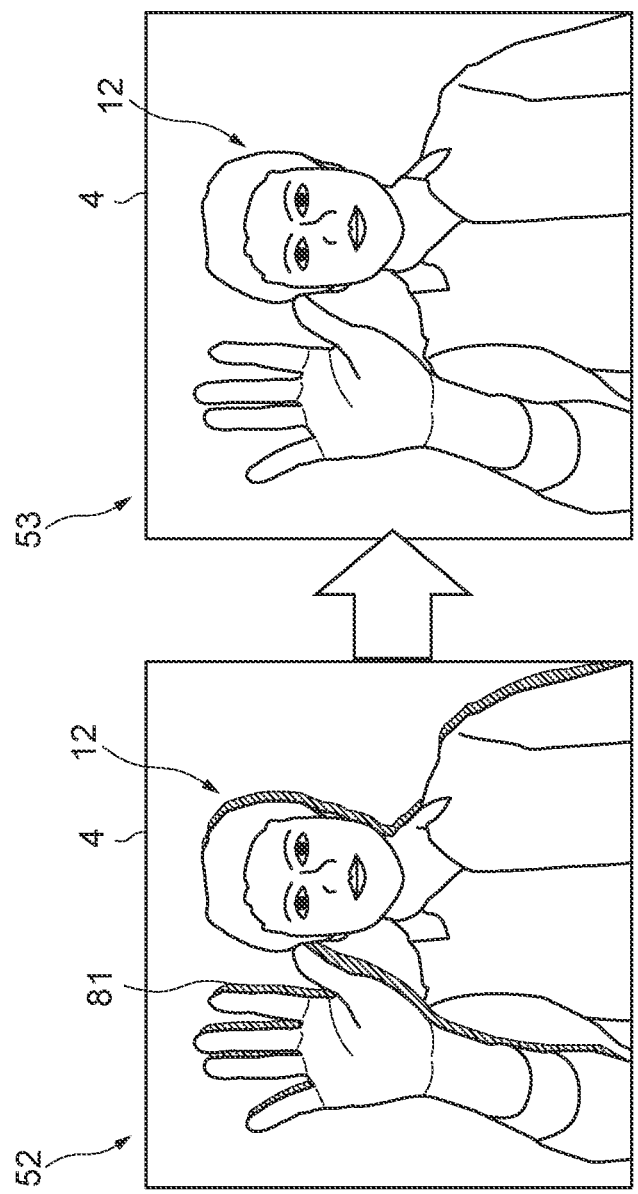
FIGS. 8A and 8B are diagrams for describing occlusion region complementing processing at the time of image generation in the display apparatus.

FIGS. 8A and 8B are diagrams for describing the occlusion region. For example, it is assumed that a person 12 who is a subject is imaged from a left oblique direction from the front using the rear camera 3 and an image thereof is acquired. If an image of a person viewed from the front is generated by performing the coordinate conversion processing using the point cloud data of the image acquired by the rear camera 3, as shown in FIG. 8A, a region, which is hidden and is not visible due to the position of the person 12 in the image before the conversion processing, is generated as an occlusion region 81 in an image 52 obtained after the coordinate conversion processing. The occlusion region 81 is a region in which no point cloud data exists and an image cannot be generated. In FIG. 8A, the occlusion region 81 is indicated by oblique lines.

The occlusion region 81 is complemented, and as shown in FIG. 8B, a display image 53 in which an image of the missing occlusion region 81 is complemented is generated. As a result, a display image without a sense of discomfort can be obtained, and a sense of realism and a sense of immersion can be enhanced.

For example, image correction processing such as an image generation model generative adversarial networks (GAN) can be used for the occlusion region complementing processing.

Further, if the time-series image data is input, a dual video discriminator GAN (DVD-GAN) method using time-series information can be applied. In this method, since the information of the preceding and succeeding frames can be utilized instead of the conventional GAN in units of one frame, it is possible to complement the occlusion region with higher accuracy, and to obtain a display image with less sense of discomfort. For example, if a region previously captured by the camera becomes the occlusion region, the image information obtained in the past can be used.

As described above, in this embodiment, using the distance image of the front camera 6 and the distance image and the RGB image of the rear camera 3, a visual field image, which is acquired by the image sensor of the rear camera 3 with the viewpoint as the rear camera 3, can be converted into a visual field image with the viewpoint of the photographer as a reference, to thereby provide a display image.

Note that the display image generation method has been described as an example by referring to the case where the display apparatus 1 is gripped in the vertical direction such that the cameras 3 and 6 are positioned higher than the display unit 4, but the present technology can be applied to a case where the display apparatus 1 is gripped in the horizontal direction. Regardless of the camera orientation, it is possible to obtain a display image by the calculation method described above without changing the relative orientation of the coordinate system of the cameras 3 and 6 and the position of the display unit origin A.

Second Embodiment

In this embodiment, description will be given on an example in which a superimposing image is superimposed on the image obtained by imaging the far side by the display apparatus 1 of the present technology. Here, an example in which the superimposing image is a virtual object will be described.

Figure 9:
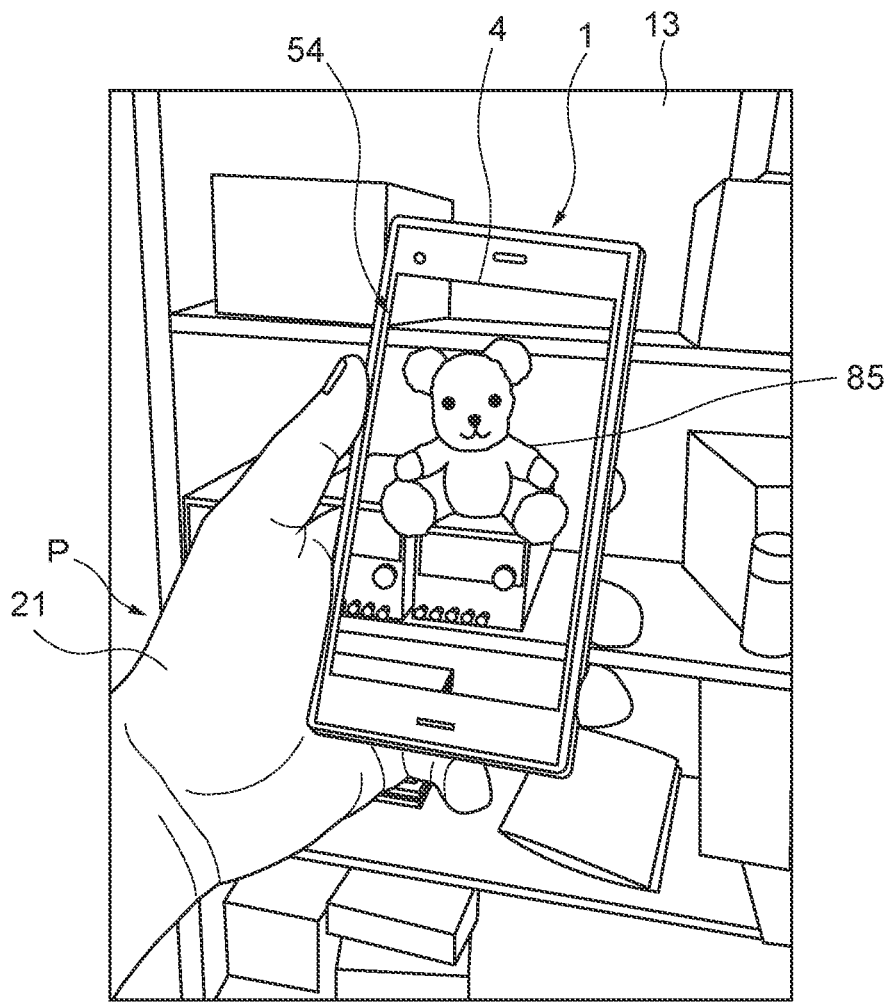
FIG. 9 is a diagram showing an example of a display image of a display apparatus according to a second embodiment and a state in which a photographer holds the display apparatus in the hand.
Figure 10:
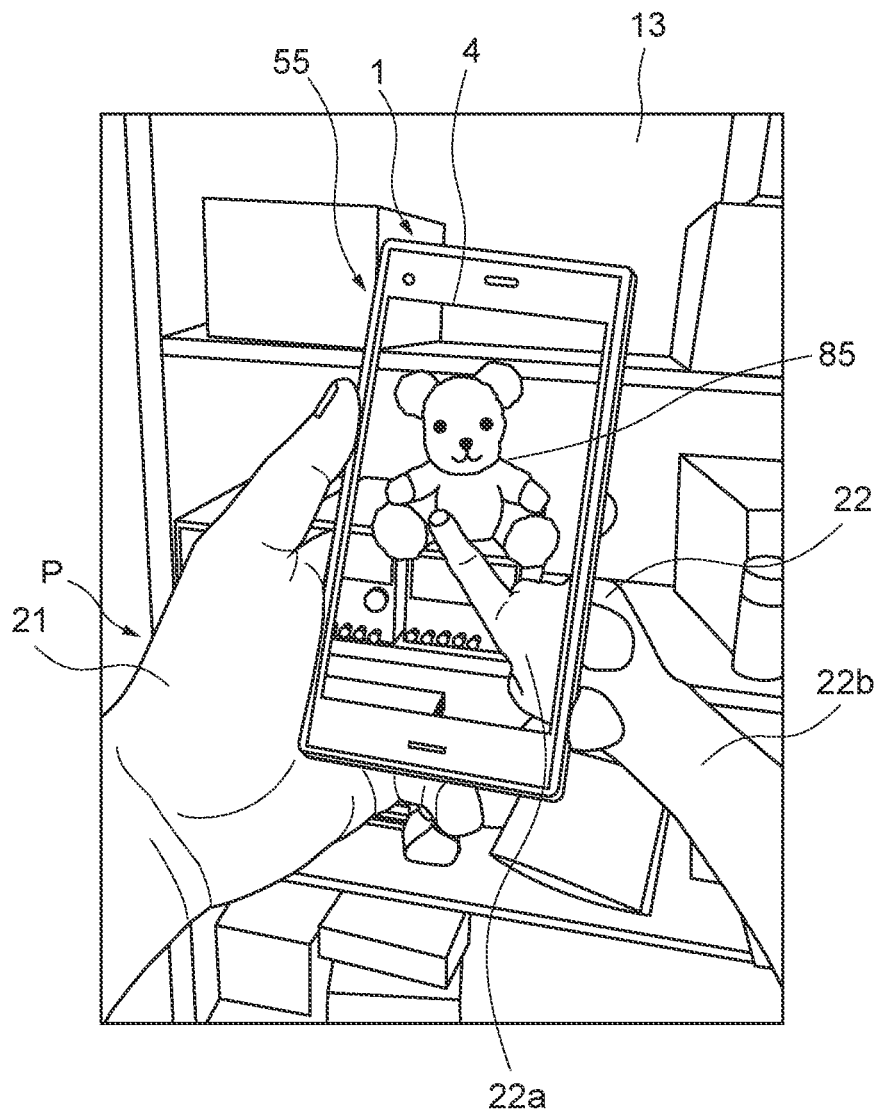
FIG. 10 is a diagram showing an example of a display image of the display apparatus according to the second embodiment and a state in which a photographer holds the display apparatus in the hand.

FIGS. 9 and 10 shows a state in which the photographer P is gripping the display apparatus 1 with the left hand 21. On the display unit 4 of the display apparatus 1 of FIG. 9, a display image 54 is displayed, in which a virtual object 85 in the form of a bear is superimposed and displayed on an image obtained by imaging the far side of the display apparatus 1. On the display unit 4 of the display apparatus 1 of FIG. 10, a display image 55 is displayed, in which the virtual object 85 is superimposed and displayed on an image obtained by imaging the far side of the display apparatus 1.

In FIG. 10, the photographer P looks at the display image 55 on which the virtual object 85 is superimposed, and points to the virtual object 85 in the display image 55 with the right hand 22 in the space.

In such a manner, the display image may be generated by superimposing the virtual object 85 on the display image generated by the display image generation method described above.

The virtual object 85 is a virtual object in a virtual space. In this embodiment, the display image in which the virtual object 85 is superimposed on the image of the existing subject captured by the rear camera 3 of the display apparatus 1 is displayed on the display unit 4. As shown in FIGS. 9 and 10, since the display image is generated by superimposing the virtual object 85 on the image that appears to be continuous to the scene 13 on the far side of the display apparatus 1, the photographer P can feel as if the virtual object 85 exists in the real space and can experience a high sense of immersion and sense of realism in the AR world.

Further, as shown in FIG. 10, when the photographer P points to the virtual object 85 with the right hand 22, the photographer P visually recognizes the image as if a right hand portion 22a in the display image 55 and a right hand portion 22b outside the display apparatus 1 are continuous, so that the photographer P can feel as if the photographer P touches the virtual object 85 more realistically.

As shown in FIG. 10, if it is assumed that the photographer performs an operation with a finger of the photographer after viewing the display image in which the virtual object 85 is superimposed and displayed, the display image may be generated as follows. Specifically, a hand region appearing in the display image generated by the above-mentioned display image generation may be extracted, and a display image may be generated, in which the virtual object 85 is deformed or moved in accordance with the distance information of the hand region obtained by the rear camera 3 and the position of the virtual object 85 when a part of the hand region contacts the virtual object 85.

This allows the photographer to experience a higher sense of immersion and sense of realism in the AR world.

Third Embodiment

The image generation unit 7 may change the display content of the virtual image to be superimposed on the display image in accordance with the distance between the viewpoint of the photographer P and the display unit. Hereinafter, description will be given with reference to FIGS. 11A and 11B. Here, an example in which the superimposing image is a character image will be described.

Figure 11B:
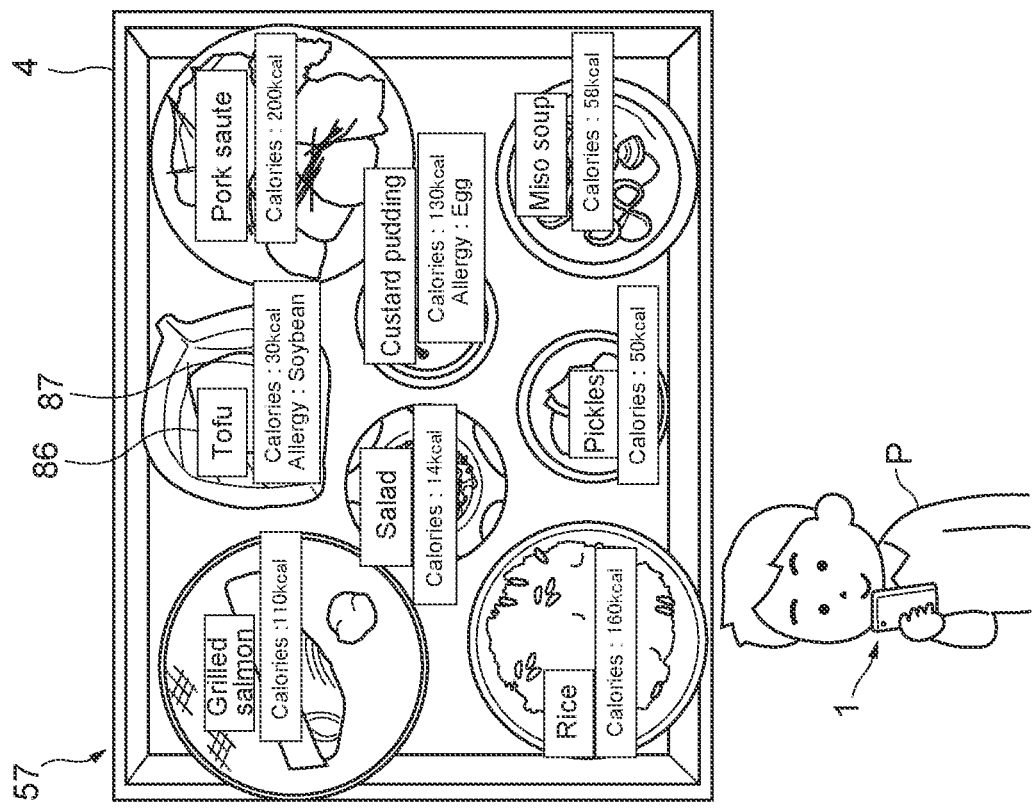
FIGS. 11A and 11B are diagrams showing an example of a display image displayed by a display apparatus according to a third embodiment.
Figure 11A:
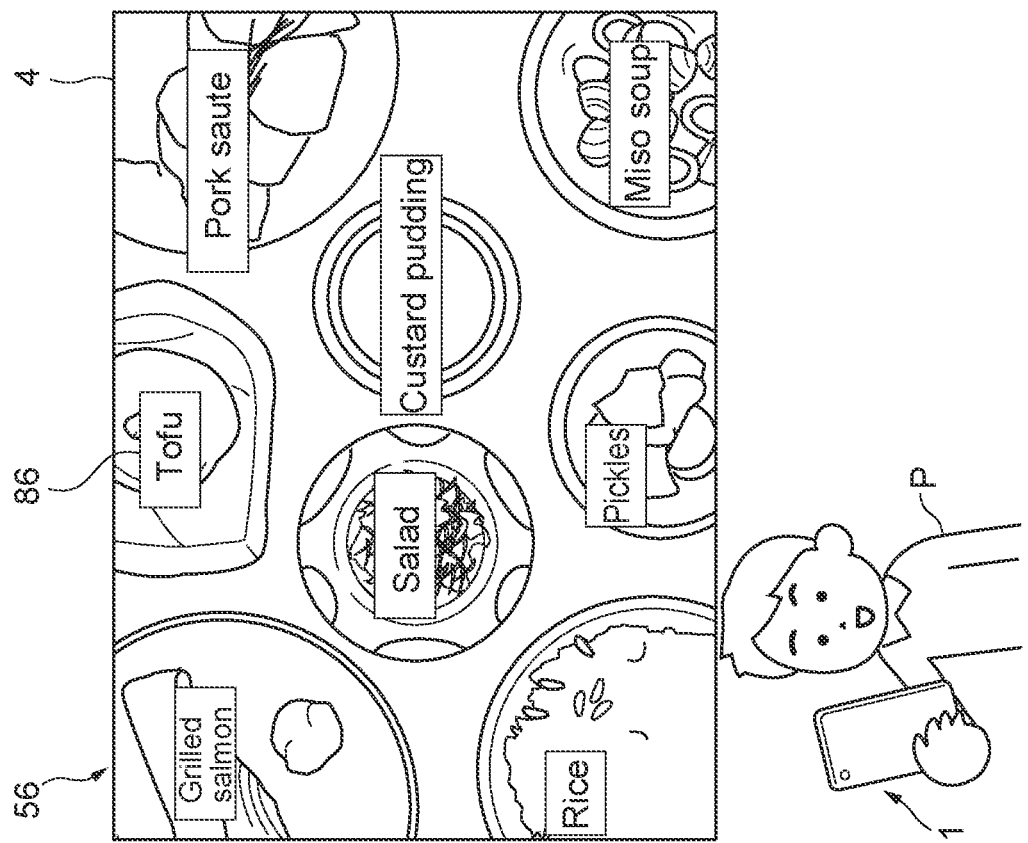

FIGS. 11A and 11B show examples of a state of a photographer and display images 56 and 57 displayed on the display unit 4 of the display apparatus 1 when the photographer P takes an image of a plurality of dishes on a tray by using the rear camera 3 of the display apparatus 1.

The display image 56 in FIG. 11A is an image displayed on the display unit 4 when the photographer P takes the image with the display apparatus 1 spaced away from the eyes and close to the dishes.

The display image 57 in FIG. 11B is an image displayed on the display unit 4 when the photographer P takes the image with the display apparatus 1 close to the eyes and spaced away from the dishes.

The image taken with the display apparatus 1 close to the dishes, which is shown in FIG. 11A, is an image in which the plurality of dishes as a subject is enlarged more than in the image taken with the display apparatus 1 spaced away from the dishes, which is shown in FIG. 11B.

In this embodiment as well, similarly to the embodiments described above, the display image is generated such that the image viewed from the viewpoint of the photographer P is generated, and the scene on the far side displayed on the display unit 4 and the scene outside the display apparatus 1, which is not obstructed by the presence of the display apparatus 1, appear to be continuous.

The distance between the viewpoint of the photographer P and the display unit 4 can be obtained by the three-dimensional position calculation processing for the viewpoint described in the first embodiment. In this embodiment, if the calculated distance is a preset threshold value or larger, as shown in FIG. 11A, the display image 56 is generated by superimposing a character image 86 of the name of the food placed on each plate. If the calculated distance is less than the threshold value, as shown in FIG. 11B, a character image 87 indicating food information such as calorie information or allergy information is superimposed in addition to the character image 86 of the name of the food, to generate the display image 57.

Further, in the examples shown in FIGS. 11A and 11B, the size of the character image is changed in accordance with the distance between the viewpoint of the photographer P and the display unit, in addition to changing the display content.

Compared to FIG. 11A, in the example shown in FIG. 11B, since the photographer P looks at the display unit 4 with the eyes close to the display apparatus 1, the photographer P can read it even if the characters are relatively small. Further, since small characters are displayed, more information can be displayed. On the other hand, in FIG. 11A, the content information of the food placed on the plate is reduced more and the characters are enlarged, so that the photographer P can roughly grasp the food content information even if the photographer P looks away from the display apparatus 1.

In such a manner, the image generation unit 7 may generate the display image by changing the display content information of the superimposing image in accordance with the distance between the viewpoint of the photographer P and the display unit. Note that the change in the display content of the superimposing image includes the case where the size of the superimposing image to be displayed is different even if the information content is the same (in this case, the size of the character), in addition to the case where the information content to be displayed is different.

Further, in this embodiment, the display image in which the far side is visible through the display apparatus 1 is displayed. Further, the character image is superimposed and is visually recognized as if characters indicating the name and food information are placed on the food recognized under direct vision.

Fourth Embodiment

In the third embodiment, an example has been described, in which the display content of the superimposing image is changed in accordance with the distance between the viewpoint and the display unit 4. In addition, the line-of-sight direction of the user may be estimated and the display content of the superimposing image may be changed in accordance with the estimated line-of-sight direction. Hereinafter, description will be given with reference to FIGS. 11B, 12, and 13.

Figure 12:
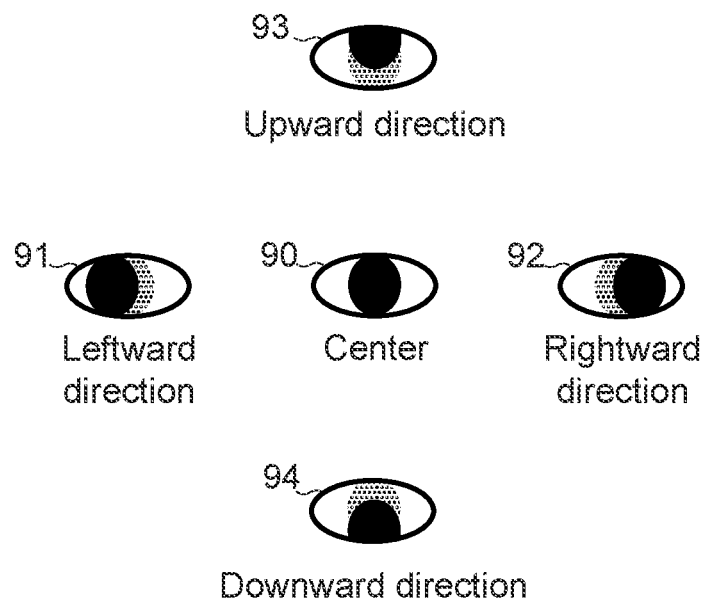
FIG. 12 is a diagram for describing a method of detecting the line of sight of a photographer in a display image generation method by a display apparatus in a fourth embodiment.

An example of the processing for performing line-of-sight detection from the distance image or RGB image obtained by imaging with the front camera 6 will be described with reference to FIG. 12. In FIG. 12, a region indicated by dots indicates a region of the pupil when the pupil is located at the center of the eye. The line-of-sight detection processing is performed by a line-of-sight detection processing unit (not shown).

The line-of-sight detection processing unit detects the photographer's face from the image, and the positions of the right and left eyes of the face are detected by image recognition processing. Further, the line-of-sight detection is performed on the basis of the position of the pupil of the eye detected by the image recognition processing. In general, when the eyes are moved unconsciously, the pupils of the right and left eyes exhibit the same behavior. For example, if the face is not moved and the line of sight is directed upward, the pupils of the right and left eyes move upward. Therefore, it is possible to perform the line-of-sight detection using the position of the pupil of one eye that is open.

As shown in FIG. 12, if a state 90 in which the pupil is located at the center of the eye is detected by image recognition, it is assumed that the line of sight is in the center direction. If a state 91 in which the pupil is located on the left side of the eye is detected by image recognition, it is assumed that the line of sight is in the leftward direction. If a state 92 in which the pupil is located on the right side of the eye is detected by image recognition, it is assumed that the line of sight is rightward direction. If a state 93 in which the pupil is located on the upper side of the eye is detected by image recognition, it is assumed that the line of sight is in the upward direction. If a state 94 in which the pupil is located on the lower side of the eye is detected by image recognition, it is assumed that the line of sight is in the downward direction.

Figure 13:
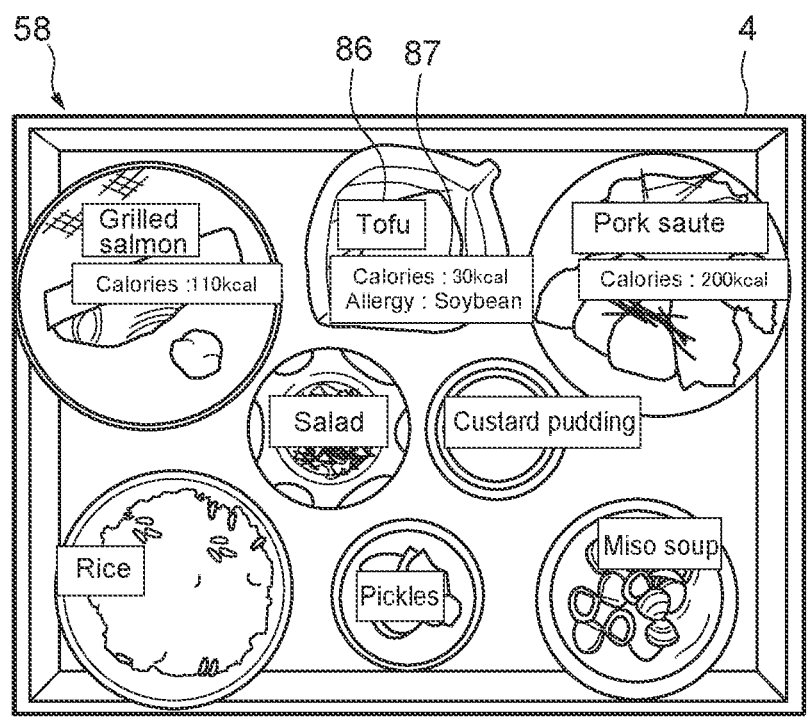
FIG. 13 is a diagram showing an example of a display image displayed by the display apparatus according to the fourth embodiment.

FIG. 13 is a display image example generated by changing the display content of the superimposing image in accordance with the line-of-sight direction of the photographer.

For example, if the line-of-sight direction is the center direction, as shown in FIG. 11B, the character image 86 indicating the name of food and the character image 87 indicating food information are superimposed to correspond to each of the dishes.

On the other hand, if the line-of-sight direction is the upward direction, it is regarded that the photographer P is paying attention to the upper portion of the display image. As shown in FIG. 13, the character image 86 indicating the name of food and the character image 87 indicating food information are superimposed to correspond to the plates of the grilled salmon, tofu, and pork saute located on the upper side of the display image, to display more detailed information. On the other hand, only the character image 86 indicating the name of food is superimposed on the plates of the rice, pickles, and miso soup located on the lower side of the display image 58 and on the plates of the salad and custard pudding located at the center of the display image 58 in the vertical direction, to display simplified information. In such a manner, the display content of the superimposing image may be changed in accordance with the line of sight of the photographer P.

Fifth Embodiment

In the embodiment described above, an example has been described in which the display image is generated with the center between the right and left eyes as the viewpoint if the right and left eyes are open, and with the center of one open eye as the viewpoint if the other eye is closed. As described in this embodiment, the present technology can also be applied to binocular stereoscopic vision in which different images are presented to the right and left eyes by the display unit 4. Hereinafter, description will be given with reference to FIG. 14.

Figure 14:
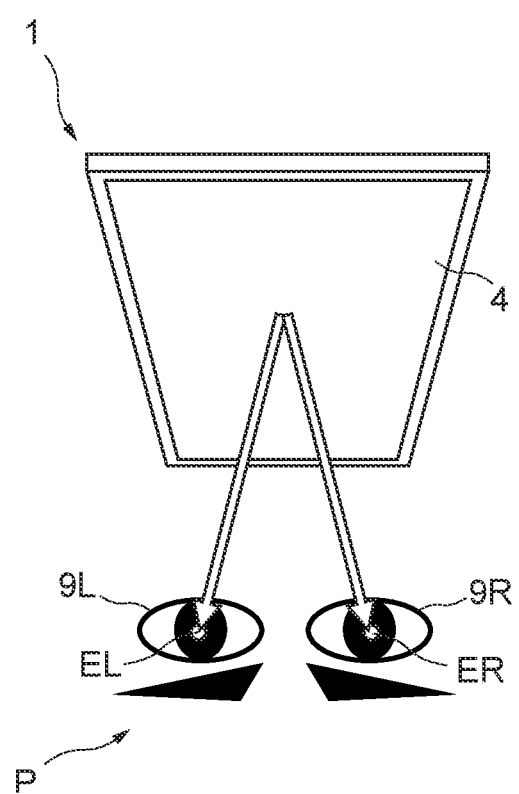
FIG. 14 is a diagram for describing a display image generation method by a display apparatus in a fifth embodiment.

FIG. 14 is a schematic diagram for describing binocular stereoscopic vision.

In this embodiment, the image generation unit 7 calculates, using the distance image obtained by the front camera 6, the three-dimensional positions of a left-eye viewpoint EL of a left eye 9L and a right-eye viewpoint ER of a right eye 9R in the same manner as in the above embodiment. The center of the pupil of each eye is defined as a viewpoint E.

Further, the image generation unit 7 performs the coordinate conversion processing and the occlusion complementing processing in the same manner as in the above embodiment using the left-eye viewpoint EL and the right-eye viewpoint ER, and generates a left-eye display image and a right-eye display image.

In order to implement stereoscopic display, there are a lenticular method in which a lenticular lens is combined with the display unit 4, a parallax barrier method using a parallax barrier, and the like. Here, the parallax barrier method will be described as an example.

The parallax barrier is a slit array in which vertical slits are arranged in the horizontal direction and can be manufactured by lithography or the like on the display unit 4. Limiting the horizontal traveling direction of the light rays exiting from the display unit 4 by the slits of the parallax barrier makes it possible to control the horizontal traveling direction of the light rays. In a plurality of display pixels constituting the display unit 4, display pixels for displaying a left-eye display image and display pixels for displaying a right-eye display image are alternately and repeatedly arranged in the horizontal direction.

In such a manner, the display apparatus is configured to allow stereoscopic display, so that the photographer P can further experience a high sense of immersion and sense of realism in the AR world.

Other Configuration Examples

The embodiments of the present technology are not limited to the embodiments described above, and various modifications can be made without departing from the gist of the present technology.

For example, at the time of coordinate conversion processing, it is necessary to recognize the relative positional relationship between the position of the object or viewpoint and the display apparatus. In the above embodiments, an example has been described in which a result of the image recognition is used when the relative positional relationship is recognized, but in addition to the above, the position and posture information of the display apparatus 1, which is acquired from an inertial measurement unit (IMU) as a third sensor mounted on the display apparatus 1, may be used. As a result, it is possible to implement image display with high response. Further, the self-position and posture information of the display apparatus, which is estimated by using simultaneous localization and mapping (SLAM), may be used.

Further, in the above embodiments, the camera having both the image sensor and the distance sensor has been described as an example, but the image sensor and the distance sensor may be provided separately. In this case, the image sensor and the distance sensor are disposed close to each other. If the image sensor and the distance sensor are provided separately, the coordinate conversion processing in the display image generation method is performed in consideration of the positional relationship between the image sensor and the distance sensor. For example, for simplicity of calculation, assuming that the image sensor of the rear camera is calibrated separately from the distance sensor of the rear camera, and the RGB value is mapped to the distance value to obtain the point cloud, only the distance sensor coordinate system can be used as a calculation target.

Further, for example, in the embodiments described above, the distance image obtained from the ToF-method distance sensor of the front camera 6 is used when the three-dimensional position of the viewpoint is calculated, but the present technology is not limited thereto. The distance image, which is the sensing result obtained from the ToF-method distance sensor, includes both the distance information and the two-dimensional position information of the eye of photographer. The calculation of the three-dimensional position of the viewpoint only needs the distance information and the two-dimensional position information of the eye of photographer. Those pieces of information may be acquired by the same sensor or may be acquired by different sensors.

For example, a distance sensor such as a structured light sensor or a patterned stereo sensor may be used as the second sensor to acquire the distance information and the two-dimensional position information of the eye of the photographer. Alternatively, a stereo camera using two cameras (image sensors) may be used as the second sensor. A sensor for acquiring the two-dimensional position information of the eye may be provided separately from the sensor for acquiring the distance information, and the second sensor for acquiring the distance information and the two-dimensional position information of the eye of the photographer may include one or more sensors.

Note that, for example, when the texture of the object in the image is small, the ToF method provides a smaller occlusion region than in the structured light sensor, the patterned stereo sensor, and the stereo camera. Therefore, it is more favorable to use a ToF-method distance sensor from the standpoint of stably generating a display image without a sense of discomfort.

Further, for example, in the embodiments described above, an example has been described, in which the face detection and the two-dimensional position detection of the pupils of the right and left eyes are performed using the distance image acquired by the front camera 6 when the three-dimensional position of the viewpoint is calculated, but the present technology is not limited thereto. The face detection and the two-dimensional position detection of the pupils of the right and left eyes may be performed using the RGB image acquired by the image sensor of the front camera 6.

Further, in the embodiments described above, the virtual object and the character image are exemplified as the superimposing image, but the present technology is not limited thereto. For example, an object region or the like cut out from an actually captured image may be used as a superimposing image, or one obtained by performing processing such as changing the color of the cut-out object region or the like may be used as a superimposing image.

In addition, the present technology can be applied to a case where a virtual object fixed to a room is displayed by AR, so that the photographer can feel a more realistic size of the virtual object.

Note that the present technology may take the following configurations.

(1) A display apparatus, including:
   a first image sensor disposed on a first surface side of an apparatus main body;
   a first distance sensor disposed on the first surface side;
   a second sensor disposed on a second surface side opposite to the first surface side;
   a display unit disposed on the second surface side; and
   an image generation unit that generates a display image to be displayed on the display unit, using a two-dimensional image of a subject and a distance image of the subject, the two-dimensional image being acquired by the first image sensor, the distance image being acquired by the first distance sensor, on the basis of three-dimensional position information of a viewpoint of a photographer, the three-dimensional position information being calculated on the basis of a sensing result acquired by the second sensor.

(2) The display apparatus according to (1), in which
   the image generation unit coordinate-converts point cloud of the subject, the point cloud being acquired from the two-dimensional image and the distance image, to generate the display image as viewed from the viewpoint of the photographer.

(3) The display apparatus according to (2), in which
   the image generation unit calculates coordinates of an intersection between a straight line from the viewpoint to each point of the point cloud of the subject and a plane of the display unit with a three-dimensional position of the viewpoint of the photographer as an origin, and coordinate-converts the point cloud such that each point of the point cloud of the subject is mapped to the corresponding coordinates of the intersection, to generate the display image.

(4) The display apparatus according to (2) or (3), in which
   the image generation unit complements an occlusion region generated by the coordinate-conversion in the image viewed from the viewpoint of the photographer to generate the display image.

(5) The display apparatus according to any one of (2) to (4), further including
   a third sensor that acquires position and posture information of the display apparatus, in which
   the image generation unit generates the display image using the position and posture information.

(6) The display apparatus according to any one of (2) to (5), in which
   the image generation unit calculates the three-dimensional position information of the viewpoint in accordance with an open or closed state of an eye of the photographer when calculating the three-dimensional position information of the viewpoint of the photographer from the sensing result of the second sensor.

(7) The display apparatus according to (6), in which
   the image generation unit sets an open eye of the photographer as the viewpoint if another eye of the photographer is closed, and sets the center of a line segment connecting both eyes of the photographer as the viewpoint if both eyes are open, to calculate the three-dimensional position information.

(8) The display apparatus according to any one of (2) to (7), in which
   the image generation unit generates the display image using a right-eye image and a left-eye image that are generated with positions of right and left eyes of the photographer as the viewpoints.

(9) The display apparatus according to any one of (2) to (8), in which
   the image generation unit generates the display image in which a superimposing image is superimposed.

(10) The display apparatus according to (9), in which
   the image generation unit generates the display image in which a superimposing image is superimposed, the superimposing image including display content changed in accordance with a distance between the viewpoint of the photographer and the display unit.

(11) The display apparatus according to (9), in which
   the image generation unit generates the display image in which a superimposing image is superimposed, the superimposing image including display content changed in accordance with a line of sight of the photographer.

(12) The display apparatus according to any one of (1) to (11), in which
   the sensing result acquired by the second sensor includes distance information and two-dimensional position information of an eye of the photographer.

(13) The display apparatus according to (12), in which
   the second sensor is a time-of-flight (ToF) sensor.

(14) An image generation method for a display apparatus including a first image sensor disposed on a first surface side of an apparatus main body, a first distance sensor disposed on the first surface side, a second sensor disposed on a second surface side opposite to the first surface side, and a display unit disposed on the second surface side, the method including:
   acquiring a two-dimensional image of a subject from the first image sensor;
   acquiring a distance image of the subject from the first distance sensor;
   acquiring a sensing result from the second sensor;
   calculating three-dimensional position information of a viewpoint of a photographer on the basis of the sensing result; and
   generating a display image to be displayed on the display unit, using the two-dimensional image and the distance image, on the basis of the three-dimensional position information.

(15) A program, which causes a display apparatus including a first image sensor disposed on a first surface side of an apparatus main body, a first distance sensor disposed on the first surface side, a second sensor disposed on a second surface side opposite to the first surface side, and a display unit disposed on the second surface side to execute the steps of:
   acquiring a two-dimensional image of a subject from the first image sensor;
   acquiring a distance image of the subject from the first distance sensor;
   acquiring a sensing result from the second sensor;
   calculating three-dimensional position information of a viewpoint of a photographer on the basis of the sensing result; and
   generating a display image to be displayed on the display unit, using the two-dimensional image and the distance image, on the basis of the three-dimensional position information.

REFERENCE SIGNS LIST 1 display apparatus
2 first surface
3 rear camera (first image sensor, first distance sensor)

4 display unit
5 second surface
6 front camera (second sensor)
7 image generation unit
E viewpoint
P photographer
9L left eye
9R right eye
11 object (subject)
51, 53, 54 to 58 displayed image
81 occlusion region
85 virtual object (superimposing image)
86, 87 character image (superimposing image)

The invention claimed is:

1. A display apparatus, comprising:
a main body;
a first image sensor on a first surface side of the main body, wherein the first image sensor is configured to acquire a two-dimensional image of a subject;
a first distance sensor on the first surface side, wherein the first distance sensor is configured to acquire a distance image of the subject;
a second sensor on a second surface side of the main body opposite to the first surface side, wherein the second sensor is configured to acquire a sensing result;
a display unit disposed on the second surface side; and
an image generation unit configured to:
calculate a three-dimensional position of a viewpoint of a photographer based on the sensing result;
acquire a point cloud of the subject based on the two-dimensional image and the distance image;
calculate, based on the three-dimensional position of the viewpoint as an origin, a plurality of coordinates of an intersection between a straight line from the viewpoint to each point of the point cloud and a plane of the display unit;
coordinate-convert the point cloud such that each point of the point cloud is mapped to corresponding coordinates of the plurality of coordinates of the intersection; and
generate, based on the coordinate-conversion of the point cloud, a first display image viewed from the viewpoint of the photographer, wherein the display unit is configured to display the first display image.

2. The display apparatus according to claim 1, wherein the image generation unit is further configured to:
complement an occlusion region in the first display image viewed from the viewpoint of the photographer; and
generate a second display image based on the complementation of the occlusion region.

3. The display apparatus according to claim 1, further comprising a third sensor configured to acquire position and posture information of the display apparatus, wherein the image generation unit is further configured to generate the first display image based on the position and posture information.

4. The display apparatus according to claim 1, wherein the image generation unit is further configured to calculate the three-dimensional position of the viewpoint based on one of an open state or a closed state of each of a first eye and a second eye of the photographer.

5. The display apparatus according to claim 4, wherein the image generation unit is further configured to:
set, as the viewpoint, the first eye that is in the open state based on the second eye that is in the closed state; and
set, as the viewpoint, a center of a line segment connecting the first eye and the second eye that are in the open state.

6. The display apparatus according to claim 1, wherein the image generation unit is further configured to generate the first display image, based on a right-eye image and a left-eye image that are generated with positions of a right eye and a left eye of the photographer as viewpoints.

7. The display apparatus according to claim 1, wherein the image generation unit is further configured to generate the first display image in which a superimposing image is superimposed.

8. The display apparatus according to claim 7, wherein the superimposing image includes display content changeable based on a distance between the viewpoint of the photographer and the display unit.

9. The display apparatus according to claim 7, wherein the superimposing image includes display content changeable based on a line of sight of the photographer.

10. The display apparatus according to claim 1, wherein the sensing result acquired by the second sensor includes distance information and two-dimensional position information of an eye of the photographer.

11. The display apparatus according to claim 10, wherein the second sensor includes a time-of-flight (ToF) sensor.

12. An image generation method, comprising:
in a display apparatus including a main body, a first image sensor on a first surface side of the main body, a first distance sensor on the first surface side, a second sensor on a second surface side of the main body opposite to the first surface side, and a display unit disposed on the second surface side:
acquiring a two-dimensional image of a subject from the first image sensor;
acquiring a distance image of the subject from the first distance sensor;
acquiring a sensing result from the second sensor;
calculating a three-dimensional position of a viewpoint of a photographer based on the sensing result;
acquiring a point cloud of the subject based on the two-dimensional image and the distance image;
calculating, based on the three-dimensional position of the viewpoint as an origin, a plurality of coordinates of an intersection between a straight line from the viewpoint to each point of the point cloud and a plane of the display unit;
coordinate-converting the point cloud such that each point of the point cloud is mapped to corresponding coordinates of the plurality of coordinates of the intersection;
generating, based on the coordinate-conversion of the point cloud, a display image viewed from the viewpoint of the photographer; and
displaying the display image on the display unit.

13. A non-transitory computer-readable medium having stored thereon computer-executable instructions which, when executed by a display apparatus including a main body, a first image sensor on a first surface side of the main body, a first distance sensor-on the first surface side, a second sensor on a second surface side of the main body opposite to the first surface side, and a display unit disposed on the second surface side, cause the display apparatus to execute operations, the operations comprising:
acquiring a two-dimensional image of a subject from the first image sensor;
acquiring a distance image of the subject from the first distance sensor;

acquiring a sensing result from the second sensor;
calculating a three-dimensional position of a viewpoint of a photographer based on the sensing result;
acquiring a point cloud of the subject based on the two-dimensional image and the distance image;
calculating, based on the three-dimensional position of the viewpoint as an origin, a plurality of coordinates of an intersection between a straight line from the viewpoint to each point of the point cloud and a plane of the display unit;
coordinate-converting the point cloud such that each point of the point cloud is mapped to corresponding coordinates of the plurality of coordinates of the intersection;
generating, based on the coordinate-conversion of the point cloud, a display image viewed from the viewpoint of the photographer; and
displaying the display image on the display unit.

* * * * *